US 9,152,883 B2

(12) United States Patent
Urbschat et al.

(10) Patent No.: US 9,152,883 B2
(45) Date of Patent: Oct. 6, 2015

(54) SYSTEM AND METHOD FOR INCREASING THE ACCURACY OF OPTICAL CHARACTER RECOGNITION (OCR)

(76) Inventors: Harry Urbschat, Oldenburg (DE); Ralph Meier, Freiburg (DE); Thorsten Wanschura, Oldenburg (DE); Johannes Hausmann, Marseilles (FR)

( * ) Notice: Subject to any disclaimer, the term of this patent is extended or adjusted under 35 U.S.C. 154(b) by 694 days.

(21) Appl. No.: 12/588,928

(22) Filed: Nov. 2, 2009

(65) Prior Publication Data

US 2011/0103688 A1 May 5, 2011

(51) Int. Cl.
*G06K 9/62* (2006.01)
*G06K 9/00* (2006.01)
*G06K 7/10* (2006.01)
*G06K 9/03* (2006.01)

(52) U.S. Cl.
CPC ............... *G06K 9/6255* (2013.01); *G06K 9/03* (2013.01); *G06K 2209/01* (2013.01)

(58) Field of Classification Search
USPC ......... 382/155, 156, 157, 158, 159, 160, 161, 382/187, 321
See application file for complete search history.

(56) References Cited

U.S. PATENT DOCUMENTS

| | | | |
|---|---|---|---|
| 4,731,861 A * | 3/1988 | Blanton et al. ............... | 382/174 |
| 4,799,188 A | 1/1989 | Yoshimura | |
| 4,864,501 A | 9/1989 | Kucera et al. | |
| 5,191,525 A | 3/1993 | LeBrun et al. | |
| 5,201,047 A | 4/1993 | Maki et al. | |
| 5,245,672 A | 9/1993 | Wilson et al. | |
| 5,267,165 A | 11/1993 | Sirat | |
| 5,276,870 A | 1/1994 | Shan et al. | |
| 5,278,980 A | 1/1994 | Pedersen et al. | |
| 5,344,132 A | 9/1994 | LeBrun et al. | |
| 5,537,491 A | 7/1996 | Mahoney et al. | |
| 5,546,503 A | 8/1996 | Abe et al. | |
| 5,550,931 A * | 8/1996 | Bellegarda et al. ........... | 382/187 |
| 5,619,709 A | 4/1997 | Caid et al. | |
| 5,649,068 A | 7/1997 | Boser et al. | |
| 5,671,333 A | 9/1997 | Catlett et al. | |
| 5,675,710 A | 10/1997 | Lewis | |
| 5,689,620 A * | 11/1997 | Kopec et al. .................... | 706/12 |
| 5,745,889 A | 4/1998 | Burrows | |
| 5,778,362 A | 7/1998 | Deerwester | |
| 5,787,201 A | 7/1998 | Nelson et al. | |
| 5,794,178 A | 8/1998 | Caid et al. | |

(Continued)

FOREIGN PATENT DOCUMENTS

| | | |
|---|---|---|
| EP | 0 320 266 | 6/1989 |
| EP | 0 572 807 | 12/1993 |

(Continued)

OTHER PUBLICATIONS

Translation for JP 2009-238217.*

(Continued)

*Primary Examiner* — Michelle Entezari
(74) *Attorney, Agent, or Firm* — DLA Piper LLP US

(57) ABSTRACT

A system and/or method for increasing the accuracy of optical character recognition (OCR) for at least one item, comprising: obtaining OCR results of OCR scanning from at least one OCR module; creating at least one OCR seed using at least a portion of the OCR results; creating at least one OCR learn set using at least a portion of the OCR seed; and applying the OCR learn set to the at least one item to obtain additional optical character recognition (OCR) results.

32 Claims, 5 Drawing Sheets

(56) References Cited

U.S. PATENT DOCUMENTS

| | | | |
|---|---|---|---|
| 5,809,476 A * | 9/1998 | Ryan | 705/2 |
| 5,864,855 A | 1/1999 | Ruocco et al. | |
| 5,889,886 A | 3/1999 | Mahoney | |
| 5,918,223 A | 6/1999 | Blum et al. | |
| 5,937,084 A | 8/1999 | Crabtree et al. | |
| 5,956,419 A * | 9/1999 | Kopec et al. | 382/159 |
| 5,987,457 A | 11/1999 | Ballard | |
| 5,999,664 A | 12/1999 | Mahoney | |
| 6,006,221 A | 12/1999 | Liddy et al. | |
| 6,009,196 A | 12/1999 | Mahoney | |
| 6,043,819 A | 3/2000 | LeBrun et al. | |
| 6,047,299 A | 4/2000 | Kaijima | |
| 6,069,978 A * | 5/2000 | Peairs | 382/254 |
| 6,076,088 A | 6/2000 | Paik et al. | |
| 6,101,515 A * | 8/2000 | Wical et al. | 715/234 |
| 6,115,708 A | 9/2000 | Fayyad et al. | |
| 6,161,130 A | 12/2000 | Horvitz et al. | |
| 6,185,576 B1 | 2/2001 | McIntosh | |
| 6,188,010 B1 | 2/2001 | Iwamura | |
| 6,192,360 B1 | 2/2001 | Dumais et al. | |
| 6,212,532 B1 | 4/2001 | Johnson et al. | |
| 6,243,713 B1 | 6/2001 | Nelson et al. | |
| 6,275,610 B1 | 8/2001 | Hall, Jr. et al. | |
| 6,289,334 B1 | 9/2001 | Reiner et al. | |
| 6,324,551 B1 | 11/2001 | Lamping et al. | |
| 6,327,387 B1 | 12/2001 | Naoi et al. | |
| 6,453,315 B1 | 9/2002 | Weissman et al. | |
| 6,477,551 B1 | 11/2002 | Johnson et al. | |
| 6,574,632 B2 | 6/2003 | Fox | |
| 6,611,825 B1 | 8/2003 | Billheimer | |
| 6,622,134 B1 | 9/2003 | Sorkin | |
| 6,629,097 B1 | 9/2003 | Keith | |
| 6,665,668 B1 | 12/2003 | Sugaya et al. | |
| 6,665,841 B1 | 12/2003 | Mahoney et al. | |
| 6,732,090 B2 | 5/2004 | Shanahan et al. | |
| 6,741,724 B1 * | 5/2004 | Bruce et al. | 382/101 |
| 6,741,959 B1 | 5/2004 | Kaiser | |
| 6,772,164 B2 | 8/2004 | Reinhardt | |
| 6,785,810 B1 | 8/2004 | Lirov | |
| 6,944,340 B1 * | 9/2005 | Shah | 382/187 |
| 6,976,207 B1 | 12/2005 | Rujan et al. | |
| 6,983,345 B2 | 1/2006 | Lapir et al. | |
| 6,990,238 B1 | 1/2006 | Saffer | |
| 7,149,347 B1 | 12/2006 | Wnek | |
| 7,433,997 B2 | 10/2008 | Lapir et al. | |
| 7,440,938 B2 | 10/2008 | Matsubayashi et al. | |
| 7,472,121 B2 | 12/2008 | Kothari et al. | |
| 7,483,570 B1 | 1/2009 | Knight | |
| 7,509,578 B2 | 3/2009 | Rujan et al. | |
| 7,610,281 B2 | 10/2009 | Gandhi et al. | |
| 7,720,721 B1 | 5/2010 | Goldstein et al. | |
| 7,805,446 B2 | 9/2010 | Potok et al. | |
| 7,865,018 B2 * | 1/2011 | Abdulkader et al. | 382/186 |
| 7,908,430 B2 | 3/2011 | Lapir | |
| 8,015,198 B2 | 9/2011 | Rabald et al. | |
| 8,051,139 B1 | 11/2011 | Musat | |
| 8,554,852 B2 | 10/2013 | Burnim | |
| 2001/0042083 A1 | 11/2001 | Saito et al. | |
| 2002/0022956 A1 | 2/2002 | Ukrainczyk et al. | |
| 2002/0023085 A1 | 2/2002 | Keith, Jr. | |
| 2002/0129015 A1 | 9/2002 | Caudill et al. | |
| 2002/0133476 A1 | 9/2002 | Reinhardt | |
| 2002/0156760 A1 | 10/2002 | Lawrence et al. | |
| 2002/0156816 A1 * | 10/2002 | Kantrowitz et al. | 707/530 |
| 2003/0099399 A1 * | 5/2003 | Zelinski | 382/186 |
| 2004/0049411 A1 * | 3/2004 | Suchard et al. | 705/4 |
| 2004/0243601 A1 | 12/2004 | Toshima | |
| 2004/0255218 A1 * | 12/2004 | Tada et al. | 714/747 |
| 2005/0021508 A1 | 1/2005 | Matsubayashi et al. | |
| 2005/0160369 A1 * | 7/2005 | Balabanovic et al. | 715/766 |
| 2006/0142993 A1 | 6/2006 | Menendez-Pidal et al. | |
| 2006/0210138 A1 * | 9/2006 | Hilton et al. | 382/137 |
| 2007/0033252 A1 | 2/2007 | Combest | |
| 2007/0091376 A1 * | 4/2007 | Calhoon et al. | 358/3.28 |
| 2007/0244882 A1 | 10/2007 | Cha et al. | |
| 2007/0288882 A1 | 12/2007 | Kniffin et al. | |
| 2008/0040660 A1 | 2/2008 | Georke et al. | |
| 2008/0126335 A1 | 5/2008 | Gandhi et al. | |
| 2008/0208840 A1 | 8/2008 | Zhang et al. | |
| 2008/0212877 A1 | 9/2008 | Franco | |
| 2008/0252924 A1 | 10/2008 | Gangai | |
| 2009/0125529 A1 | 5/2009 | Vydiswaran et al. | |
| 2009/0198677 A1 | 8/2009 | Sheehy et al. | |
| 2009/0226090 A1 | 9/2009 | Okita | |
| 2009/0228777 A1 * | 9/2009 | Henry et al. | 715/230 |
| 2009/0274374 A1 | 11/2009 | Hirohata et al. | |
| 2010/0325109 A1 | 12/2010 | Bai | |

FOREIGN PATENT DOCUMENTS

| | | |
|---|---|---|
| EP | 0 750 266 | 12/1996 |
| EP | 0809219 | 11/1997 |
| EP | 1049030 | 11/2000 |
| EP | 1 128 278 | 8/2001 |
| EP | 1 182 577 | 2/2002 |
| EP | 1 288 792 | 3/2003 |
| EP | 1 315 096 | 5/2003 |
| GB | 2172130 | 9/1986 |
| JP | 01-277977 | 11/1989 |
| JP | 02-186484 | 7/1990 |
| JP | 04-123283 | 11/1992 |
| JP | 07-271916 | 10/1995 |
| JP | 10-91712 | 4/1998 |
| JP | 11-184894 | 7/1999 |
| JP | 11-184976 | 7/1999 |
| JP | 2000-155803 | 6/2000 |
| JP | 2003-524258 | 8/2003 |
| JP | 2005-038077 | 2/2005 |
| JP | 2009-238217 | 10/2009 |
| WO | WO 88/01411 | 2/1988 |
| WO | WO 89/04013 | 5/1989 |
| WO | WO 91/10969 | 7/1991 |
| WO | WO 98/01808 | 1/1998 |
| WO | WO 98/47081 | 10/1998 |
| WO | WO 01 42984 | 6/2001 |
| WO | WO 01/63467 | 8/2001 |
| WO | WO 02/15045 | 2/2002 |
| WO | WO 03/019524 | 3/2003 |
| WO | WO 03/044691 | 5/2003 |

OTHER PUBLICATIONS

Translation for JP 2005-038077.*
International Search Report issued in PCT/IB2010/003251, mailed May 2, 2011.
Written Opinion issued in PCT/IB2010/003251, mailed May 2, 2011.
International Search Report issued in PCT/IB2010/003250, mailed May 2, 2011.
Written Opinion issued in PCT/IB2010/003250, mailed May 2, 2011.
Suzanne Liebowitz Taylor et al., "Extraction of Data from Preprinted Forms," Machine Vision and Applications, vol. 5, pp. 211-222, Jan. 1992.
International Search Report issued in PCT/IB2010/050087, mailed May 27, 2011.
Written Opinion issued in PCT/IB2010/050087, mailed May 27, 2011.
File History of U.S. Appl. No. 12/106,450 electronically captured on Sep. 22, 2011.
File History of U.S. Appl. No. 10/204,756 electronically captured on Sep. 22, 2011.
File History of U.S. Appl. No. 12/610,915 electronically captured on Sep. 22, 2011.
File History of U.S. Appl. No. 12/610,937 electronically captured on Sep. 22, 2011.
File History of U.S. Appl. No. 12/570,412 electronically captured on Sep. 22, 2011.
File History of U.S. Appl. No. 13/024,086 electronically captured on Sep. 22, 2011.
File History of U.S. Appl. No. 13/192,703 electronically captured on Sep. 22, 2011.

(56) References Cited

OTHER PUBLICATIONS

File History of U.S. Appl. No. 12/106,450 electronically captured on Nov. 10, 2010.
Office Action issued in Canadian Patent Application No. 2,459,182, mailed Oct. 26, 2010.
File History of U.S. Appl. No. 10/204,756 electronically captured on Nov. 30, 2011 for Sep. 22, 2011 to Nov. 30, 2011.
File History of U.S. Appl. No. 12/610,915 electronically captured on Nov. 30, 2011 for Sep. 22, 2011 to Nov. 30, 2011.
File History of U.S. Appl. No. 12/208,088 electronically captured on Nov. 30, 2011 for May 12, 2011 to Nov. 30, 2011.
Office Action issued in Canadian Application No. CA 2,419,776, dated Aug. 16, 2011.
Notice of Allowance issued in Canadian Application No. 2,459,182, dated Oct. 28, 2011.
International Search Report issued in PCT/IB2010/003252, mailed Jan. 24, 2012.
Written Opinion issued in PCT/IB2010/003252, mailed Jan. 24, 2012.
A. Dengal et al., "Chapter 8:: Techniques for Improving OCR Results", Handbook of Character Recognition and Document Image Analysis, pp. 227-258, Copyright 1997 World Scientific Publishing Company.
Remy Mullot, "Les Documents Ecrits", Jan. 1, 2006, Lavoisier—Hermes Science, pp. 351-355, "Section 7.6.3 Reconnaissance des caracteres speciaux ou endommages".
L. Solan, "The Language of the Judges", University of Chicago Press, pp. 45-54, Jan. 1, 1993.
File History of U.S. Appl. No. 13/024,086 electronically captured on Mar. 8, 2012 for Jan. 11, 2012 to Mar. 8, 2012.
File History of U.S. Appl. No. 12/208,088 electronically captured on May 9, 2012, for Jan. 12, 2012 to May 9, 2012.
File History of U.S. Appl. No. 12/610,915 electronically captured on May 9, 2012, for Nov. 30, 2011 to May 9, 2012.
File History of U.S. Appl. No. 12/610,937 electronically captured on May 9, 2012, for Sep. 23, 2011 to May 9, 2012.
File History of U.S. Appl. No. 12/191,774 electronically captured on Sep. 16, 2010.
File History of U.S. Appl. No. 10/204,756 electronically captured on Sep. 16, 2010.
File History of U.S. Appl. No. 12/106,450 electronically captured on May 12, 2011.
File History of U.S. Appl. No. 10/204,756 electronically captured on May 12, 2011.
File History of U.S. Appl. No. 10/208,088 electronically captured on May 12, 2011.
File History of U.S. Appl. No. 13/024,086 electronically captured on May 12, 2011.
European Office Action issued in EP 01127768.8, mailed Feb. 17, 2011.
R.M, Lea et al., "An Associative File Store Using Fragments for Run-Time Indexing and Compression", SIGIR'80, Proceedings of the 3rd Annual ACM Conference on Research and Development in information Retrieval, pp. 280-295 (1980).
M. Koga et al., "Lexical Search Approach for Character-String Recognition", DAS'98, LNCS 1655, pp. 115-129 (1999).
File History of U.S. Appl. No. 12/191,774 electronically captured on Feb. 24, 2011.
File History of U.S. Appl. No. 10/204,756 electronically captured on Feb. 24, 2011.
File History of U.S. Appl. No. 13/024,086 electronically captured on Feb. 24, 2011.
File History of U.S. Appl. No. 10/204,756 electronically captured on Jan. 11, 2012, for Dec. 1, 2011 to Jan. 11, 2012.
File History of U.S. Appl. No. 12/208,088 electronically captured on Jan. 11, 2012, for Dec. 1, 2011 to Jan. 11, 2012.
File History of U.S. Appl. No. 13/024,086 electronically captured on Jan. 11, 2012, for Sep. 23, 2011 to Jan. 11, 2012.
File History of U.S. Appl. No. 13/192,703 electronically captured on Jan. 11, 2012, for Sep. 23, 2011 to Jan. 11, 2012.

James Wnek, "learning to Identify Hundreds of Flex-Form Documents", IS&T /SPIE Conference on Document Recognition and Retrieval VI, San Jose, CA, SPIE vol. 3651, pp. 173-182 (Jan. 1999).
English translation of Remy MULLOT, "Les Documents Ecrits", Jan. 1, 2006, Lavoisier—Hermes Science, pp. 351-355, "Section 7.6.3 Reconnaissance des caracteres speciaux ou endommages".
Dave, et al., Mining the Peanut Gallery: Opinion Extraction and Semantic Classification of Product Reviews, ACM 1-58113-680-03/03/0005, May 20-24, 2003, pp. 1-10.
Dreier, Blog Fingerprinting: Identifying Anonymous Posts Written by an Author of Interest Using Word and Character Frequency Analysis, Master's Thesis, Naval Postgraduate School, Monterey, California, Sep. 2009, pp. 1-93.
File History of U.S. Appl. No. 10/204,756 electronically captured on Mar. 13, 2013 for Jan. 11, 2012 to Mar. 13, 2013.
File History of U.S. Appl. No. 12/208,088 electronically captured on Mar. 13, 2013 for May 9, 2012 to Mar. 13, 2013.
File History of U.S. Appl. No. 12/610,915 electronically captured on Mar. 13, 2013 for May 9, 2012 to Mar. 13, 2013.
File History of U.S. Appl. No. 12/610,937 electronically captured on Mar. 13, 2013 for May 9, 2012 to Mar. 13, 2013.
File History of U.S. Appl. No. 12/570,412 electronically captured on Mar. 13, 2013 for Sep. 22, 2011 to Mar. 13, 2013.
File History of U.S. Appl. No. 13/024,086 electronically captured on Mar. 13, 2013 for Mar. 8, 2012 to Mar. 13, 2013.
File History of U.S. Appl. No. 13/192,703 electronically captured on Mar. 13, 2013 for Jan. 11, 2012 to Mar. 13, 2013.
File History of U.S. Appl. No. 13/477,645 electronically captured on Mar. 13, 2013.
File History of U.S. Appl. No. 13/548,042 electronically captured on Mar. 13, 2013.
File History of U.S. Appl. No. 13/624,443 electronically captured on Mar. 13, 2013.
File History of U.S. Appl. No. 10/204,756 electronically captured on May 22, 2014 for Nov. 25, 2013 to May 22, 2014.
File History of U.S. Appl. No. 12/610,915 electronically captured on May 22, 2014 for Nov. 25, 2013 to May 22, 2014.
File History of U.S. Appl. No. 12/610,937 electronically captured on May 22, 2014 for Nov. 25, 2013 to May 22, 2014.
File History of U.S. Appl. No. 13/192,703 electronically captured on May 22, 2014 for Nov. 25, 2013 to May 22, 2014.
File History of U.S. Appl. No. 13/477,645 electronically captured on May 22, 2014 for Nov. 25, 2013 to May 22, 2014.
Office Action issued in Canadian Application No. CA 2,796,392, mailed Apr. 30, 2014.
File History of U.S. Appl. No. 10/204,756 electronically captured on Nov. 25, 2013.
File History of U.S. Appl. No. 12/610,915 electronically captured on Nov. 25, 2013.
File History of U.S. Appl. No. 12/610,937 electronically captured on Nov. 25, 2013.
File History of U.S. Appl. No. 13/192,703 electronically captured on Nov. 25, 2013.
File History of U.S. Appl. No. 13/477,645 electronically captured on Nov. 25, 2013.
File History of U.S. Appl. No. 09/214,682 electronically captured on Nov. 25, 2013.
Office Action issued in Canadian Application No. CA 2,776,891, mailed Oct. 22, 2013.
Office Action issued in Canadian Application No. CA 2,796,392, mailed Sep. 26, 2013.
A. Krikelis et al., "Associative Processing and Processors" Computer, US, IEEE Cornputer Society, Long Beach, CA, US, vol. 27, No. 11, Nov. 1, 1994, pp. 12-17, XP000483129.
Motonobu Hattori, "Knowledge Processing System Using Multi-Mode Associate Memory", IEEE, vol. 1, pp. 531-536 (May 4-9, 1998).
H. Saiga et al., "An OCR System for Business Cards", Proc. of the 2nd Int Conf. on Document Analysis and Recognition, Oct. 20-22, 1993, pp. 802-805, XP002142832.
Simon Berkovich et al., "Organization of Near Matching in Bit Attribute Matrix Applied to Associative Access Methods in informa-

(56) References Cited

OTHER PUBLICATIONS tion Retrieval", Pro. of the 16th IASTED int Conf. Applied Informatics, Feb. 23-25, 1998, Garmisch-Partenkirchen, Germany.
D. Frietag, "Information extraction from HTML: application of a general machine learning approach", Pro. 15th National Conference on Artificial Intelligence (AAAI-98); Tenth Conference on Innovative Applications of Artificial Intelligence, Proceedings of the Fifteenth National Conference on Artificial Intelligence, Madison, WI, USA pp. 517-523, SP002197239 1998, Menlo Park, CA, USA, AAAI Press/MIT Press, USA ISBN: 0-262-51098-7.
F. Aurenhammer, Voronol Diagrams—"A survey of a fundamental geometric data structure", ACM Computing Surveys, vol. 23, No. 3, Sep. 1991, pp. 345-405.
European Office Action issued in European Application No. 01 905 729.8, mailed Nov. 22, 2007.
Witten et al., "Managing Gigabytes" pp. 128-142.
Bo-ren Bai et al. "Syllable-based Chinese text/spoken documents retrieval using text/speech queries", Int'l Journal of Pattern Recognition. 14.05 (2000): 603-616.
Foreign Search Search Report issued in EP 01127768.8 mailed Sep. 12, 2002.
European Office Action issued in EP 97931718.7, mailed May 8, 2002.
File History of U.S. Appl. No. 11/240,525 electronically captured on May 19, 2010.
File History of U.S. Appl. No. 09/561,196 electronically captured on May 19, 2010.
File History of U.S. Appl. No. 11/240,632 electronically captured on May 19, 2010.
File History of U.S. Appl. No. 10/362,027 electronically captured on May 19, 2010.
File History of U.S. Appl. No. 12/191,774 electronically captured on May 19, 2010.
File History of U.S. Appl. No. 12/106,450 electronically captured on May 19, 2010.
File History of U.S. Appl. No. 10/204,756 electronically captured on May 19, 2010.
File History of U.S. Appl. No. 12/208,088 electronically captured on May 19, 2010.
File History of U.S. Appl. No. 12/610,915 electronically captured on May 19, 2010.
File History of U.S. Appl. No. 12/610,937 electronically captured on May 19, 2010.
File History of U.S. Appl. No. 12/570,412 electronically captured on May 27, 2010.
File History of U.S. Appl. No. 10/204,756 electronically captured on Sep. 12, 2014 for May 22, 2014 to Sep. 12, 2014.
File History of U.S. Appl. No. 12/610,915 electronically captured on Sep. 12, 2014 for May 22, 2014 to Sep. 12, 2014.
File History of U.S. Appl. No. 12/610,937 electronically captured on Sep. 12, 2014 for May 22, 2014 to Sep. 12, 2014.
File History of U.S. Appl. No. 13/192,703 electronically captured on Sep. 12, 2014 for May 22, 2014 to Sep. 12, 2014.
File History of U.S. Appl. No. 13/477,645 electronically captured on Sep. 12, 2014 for May 22, 2014 to Sep. 12, 2014.
File History of U.S. Appl. No. 13/624,443 electronically captured on Sep. 12, 2014 for Mar. 13, 2013 to Sep. 12, 2014.
Office Action issued in Japanese Application No. 2012-532203, mailed Jul. 15, 2014.
Office Action issued in Canadian Application No. 2,776,891 dated May 13, 2014.
English language translation of Office Action issued in Japanese Application No. 2012-537459, mailed Jun. 17, 2014.
English language abstract and translation of JP 10-091712 published Apr. 10, 1998.
English language abstract and translation of JP 2003-524258 published Aug. 12, 2003.
English language abstract of JP 1-277977 published Nov. 8, 1989.
English language abstract of JP 2-186484 published Jul. 20, 1990.
English language abstract and translation of JP 7-271916 published Oct. 20, 1995.
English language abstract and translation of JP 11-184976 published Jul. 9, 1999.
English language abstract and translation of JP 2000-155803 published Jun. 6, 2000.
Partial English language translation of Office Action issued in Japanese Application No. 2012-532203, mailed Jul. 15, 2014.
Office Action issued in Japanese Application No. JP 2012-537457 dated Apr. 18, 2014.
English language translation of Office Action issued in Japanese Application No. JP 2012-537457 dated Apr. 18, 2014.
English language abstract of JP 2009-238217, published Oct. 15, 2009.
English language abstract and machine translation of JP 2005-038077, published Feb. 10, 2005.
G. Salton et al., "A Vector Space Model for Automatic Indexing", Communications of the ACM, vol. 18, No. 11, pp. 613-620, Nov. 1975.
Office Action issued in Australian Application No. 2010311066 dated Oct. 29, 2014.
Suzanne Liebowitz Taylor et al., "Extraction of Data from Preprinted Forms", Machine Vision and Applications, vol. 5, No. 3, pp. 211-222 (1992).
Office Action issued in Australian Application No. 2010311067 dated Oct. 21, 2014.
Office Action issued in Japanese Application No. 2012-537458 mailed Jun. 17, 2014.
English language translation of Office Action issued in Japanese Application No. 2012-537458, mailed Jun. 17, 2014.
Office Action issued in Australian Application No. 2013205566 dated Dec. 9, 2014.
Stephen V. Rice et al., "The Fifth Annual Test of OCR Accuracy", Information Science Research institute, TR-96-01, Apr. 1996 (48 pages).
Thomas A. Nartker et al., "Software Tools and Test Data for Research and Testing of Page-Reading OCR Systems", IS&T/SPIE Symposium on Electronic Imaging Science and Technology, Jan. 2005 (11 pages).
Tim Kam Ho et al., "OCR with No Shape Training", International Conference on Pattern Recognition (2000) (4 pages).
Karen Kukich, "Techniques for Automatically Correcting Words in Text", ACM Computing Surveys, vol. 24, No. 4, pp. 377-439, Dec. 1992.
Atsuhiro Takasu, "An Approximate Multi-Word Matching Algorithm for Robust Document Retrieval", CIKM'06, Nov. 5-11, 2006 (9 pages).
Kenneth Ward Church et al., "Word Association Norms, Mutual Information, and Lexicography", Computational Linguistics, vol. 16, No. 1, pp. 22-29, Mar. 1990.
Anil N. Hirani et al., "Combining Frequency and Spatial Domain Information for Fast Interactive Image Noise Removal", Proceedings of the 23rd Annual Conference on Computer Graphics and interactive Techniques, pp. 269-276 (1996).
Leonid L. Rudin et al., "Nonlinear Total Variation Based Noise Removal Algorithms", Physica D, vol. 60, pp. 259-268 (1992).
Richard Alan Peters, II, "A New Algorithm for Image Noise Reduction Using Mathematical Morphology", IEEE Transactions on Image Processing, vol. 4, No. 3, pp. 554-568, May 1995.
George Nagy, "Twenty Years of Document Image Analysis in PAMI", IEEE Transactions on Pater Analysis and Machine Intelligence, vol. 22, No. 1, pp. 38-62, Jan. 2000.
Stephen V. Rice et al., "Optical Character Recognition: An Illustrated Guide to the Frontier", Kluwer Academic Publishers, Copyright Apr. 1999.
T.A. Bayer et al., "A Generic System for Processing Invoices", 4th Int. Conf. on Document Analysis and Recognition, pp. 740-744 (1997), Aug. 1997.
D.P. Lopresti et al., "A Fast Technique for Comparing Graph Representations with Applications To Performance Evaluation", Int. Journal on Document Analysis and Recognition (IJDAR), vol. 6, pp. 219-229 (2004), Feb. 2004.

(56) References Cited

OTHER PUBLICATIONS

Takashi Hirano et al., "Field Extraction Method from Existing Forms Transmitted by Facsimile", In Proceedings of the Sixth International Conference on Document Analysis and Recognition (ICDAR), pp. 738-742, Sep. 10-13, 2001.
Donato Malerba et al., "Automated Discovery of Dependencies Between Logical Components in Document Image Understanding", In Proceedings of the Sixth International Conference on Document Analysis and Recognition (ICDAR), Sep. 10-13, 2001 (5 pages).
Frederick Schultz et al., "Seizing the Treasure: Transferring Layout Knowledge in Invoice Analysis", Proceedings of the 10th International Conference on Document Analysis and Recognition (ICDAR) (2009), Jul. 2009.
"Brainware: Invoice Processing", downloaded from Internet Archive at http://web.archive.org/web/20080512043505/http://www.brainware.com/invoice.php, archived May 12, 2008 (1 page).
"Kofax: Solutions: Invoice Processing", downloaded from Internet Archive at http://web.archive.org/web/20081012062841/http://www.kofax.com/solutions/invoice-processing.asp, archived Oct. 12, 2008 (1 page).
"Kofax: Solutions: Kofax White Papers", downloaded from Internet Archive at http://web.archive.org/web/20080928052442/http://www.kofax.com/solutions/white-papers.asp, archived Sep. 28, 2008 (2 pages).
A. Krikelis et al., "Associative Processing and Processors" Computer, US, IEEE Computer Society, Long Beach, CA, US, vol. 27, No. 11, Nov. 1, 1994, pp. 12-17, XP000483129.
International Search Report issued in related International Application No. PCT/EP01/09577, mailed Nov. 5, 2003.
Motonobu Hattori, "Knowledge Processing System Using Mulit-Mode Associate Memory" IEEE, vol. 1, pp. 531-536 (May 4-9, 1998).
International Search Report issued in International Application No. PCT/EP01/01132, mailed May 30, 2001.
H. Saiga et al., "An OCR System for Business Cards", Proc. of the 2nd Int. Conf. on Document Analysis and Recognition, Oct. 20-22, 1993, pp. 802-805, XP002142832.
Junliang Xue et al., "Destination Address Block Location on handwritten Chinese Envelope", Proc. of the 5th Int. Conf. on Document Analysis and Recognition, Sep. 20-22, 1999, pp. 737-740, XP002142833.
Machine Translation of JP 11-184894.
Simon Berkovich et al., "Organization of Near Matching In Bit Attribute Matrix Applied to Associative Access Methods In information Retrieval", Pro. Of the 16th IASTED Int. Conf. Applied Informatics, Feb. 23-25, 1998, Garmisch-Partenkirchen, Germany.
European Office Action issued in Application No. 01127768.8 mailed Sep. 10, 2008.
European Office Action issued in Application No. 01120429.4 mailed Sep. 16, 2008.
D. Frietag, "Information extraction from HTML: application of a general machine learning approach", Pro. 15th National Conference on Artificial Intelligence (AAAI-98); Tenth Conference on Innovative Applications of Artificial Intelligence, Proceedings of the Fifteenth National Conference on Artificial Intelligence, Madison, WI, USA, pp. 517-523, SP002197239 1998, Menlo Park, CA, USA, AAAI Press/MIT Press, USA ISBN: 0-262-51098-7.
European Office Action issued in Application No. 01120429.4 mailed Jun. 30, 2006.
European Office Action issued in Application No. 01120429.4 mailed Apr. 23, 2004.
E. Appiani et al., "Automatic document classification and indexing in high-volume applications", International Journal on Document Analysis and Recognition, Dec. 2001, Springer-Verlag, Germany, vol. 4, No. 2, pp. 69-83, XP002197240, ISSN: 1433-2833.
A. Ting et al., "Form recognition using linear structure", Pattern Recognition, Pergamon Press Inc., Elmsford, NY, US, vol. 32, No. 4, Apr. 1999, pp. 645-656, XP004157536, ISSN: 0031-3203.
International Search Report issued in International Application PCT/US02/27132 issued Nov. 12, 2002.

"East text search training", Jan. 2000.
European Search Report issued in European Office Action 01120429.4 mailed Jul. 19, 2002.
International Search Report issued in International Application PCT/DE97/01441, mailed Nov. 12, 1997.
Voorheas et al., "Vector expansion in a large collection", NIST Special Publication, US, Gaithersburg, MD pp. 343-351.
M. Marchard et al., "A Convergence Theorem for Sequential Laming in Two-Layer Perceptrons", Europhysics Letters, vol. 11, No. 6, Mar. 15, 1990, pp. 487-492.
F. Aurenhammer, Voronoi Diagrams —"A survey of a fundamental geometric data structure", ACM Computing Surveys, vol. 23, No. 3, Sep. 1991, pp. 345-405.
C. Reyes et al., "A Clustering Technique for Random Data Classification", International Conference on Systems, Man and Cybernetics, IEEE, p. 316-321.
International Search Report issued in PCT/EP00/03097 mailed Sep. 14, 2000.
International Preliminary Examination Report issued in PCT/EP00/03097 mailed Jul. 31, 2001.
Written Opinion issued in PCT/EP00/03097 mailed Apr. 21, 2001.
Japanese Office Action issued in Japanese Application No. 2003-522903, mailed Jul. 29, 2008.
English language translation of Japanese Office Action issued in Japanese Application No. 2003-522903, mailed Jul. 29, 2008.
European Office Action issued in European Application No. 01 905729.8, mailed Nov. 22, 2007.
Foreign Office Action issued in EP 00117850.8 mailed May 20, 2008.
Foreign Office Action issued in EP 00117850.8 mailed Jul. 20, 2006.
EP Search Report issued in EP 00117850.8 mailed Jun. 12, 2001.
International Notification issued in PCT/EP00/03097 mailed May 5, 2001.
G. Lapir, "Use of Associative Access Method for Information Retrieval System", Proc. 23rd Pittsburg Conf. on Modeling & Simulation, 1992, pp. 951-958.
Witten et al., "Managing Gigabytes" pp. 128-142, 1999.
C.J. Date, "An Introduction to Database Systems, Sixth Edition", Addison-Wesley Publishing Company, pp. 52-65 (1995).
International Search Report for PCT/US00/23784 mailed Oct. 26, 2000.
Australian Office Action in Australian application 2002331728 mailed Nov. 16, 2006.
Australian Notice of Acceptance issued in Australian application 2002331728 mailed Feb. 20, 2008.
Foreign Office Action issued in EP 01127768.8 mailed Feb. 5, 2007.
Foreign Office Action issued in EP 01127768.8 mailed Sep. 8, 2005.
Bo-ren Bai et al. "Syllable-based Chinese text/spoken documents retrieval using text/speech queries", Int'l Journal of Pattern Recognition, 2000.
Foreign Search Report issued in EP 01127768.8 mailed Sep. 12, 2002.
European Search Report issued in EP 00103810.8, mailed Aug. 1, 2000.
European Office Action issued in EP 00103810.8, mailed May 23, 2002.
International Preliminary Examination Report issued in International Application No. PCT/DE97/01441, mailed Jul. 21, 1998.
European Office Action issued in EP 00926837.6, mailed Nov. 28, 2006.
European Office Action issued in EP 00926837.6, mailed Oct. 11, 2007.
Australian Office Action issued in AU 2001282106, mailed Jul. 18, 2006.
Australian Office Action issued in AU 2001233736, mailed Aug. 26, 2005.
Australian Office Action issued in AU 2001233736, mailed Aug. 23, 2006.
European Office Action issued in EP 97931718.7, mailed Jul. 9, 2001.
European 2002 Office Action issued in EP 97931718.7, mailed May 8, 2002.
International Search Report issued in International Application No. PCT/EP98/00932, mailed Jul. 28, 1998.

(56) References Cited

OTHER PUBLICATIONS

Richard G. Casey et al., "A Survey of Methods and Strategies in Character Segmentation", IEEE Transactions on Pattern Analysis and machine Intelligence, vol. 18, No. 7, pp. 690-706 (Jul. 1996).
U.S. Appl. No. 11/240,525.
U.S. Appl. No. 09/561,196.
U.S. Appl. No. 11/240,632.
U.S. Appl. No. 10/362,027.
U.S. Appl. No. 12/191,774.
U.S. Appl. No. 12/106,450.
U.S. Appl. No. 12/208,088.
U.S. Appl. No. 12/610,915.
U.S. Appl. No. 12/570,412.
English language translation of Office Action issued in Japanese Application No. 2012-537458 mailed Jun. 17, 2014.
Andreas R. Dengel et al., "smartFIX: A Requirement Driven System for Document Analysis and Understanding", In: D. Lopresti et al., Document Analysis V, Springer, pp. 433-444 (Copyright 2002).
Bertin Klein et al., "On Benchmarking of Invoice Analysis Systems" DAS 2006, LNCS 3872, pp. 312-323 (2006), Feb. 2006.
U.S. Appl. No. 13/192,703.
U.S. Appl. No. 13/548,042.
U.S. Appl. No. 10/204,756.
U.S. Appl. No. 12/610,915.
U.S. Appl. No. 12/610,937.
U.S. Appl. No. 13/477,645.
U.S. Appl. No. 13/624,443.

\* cited by examiner

FIGURE 3
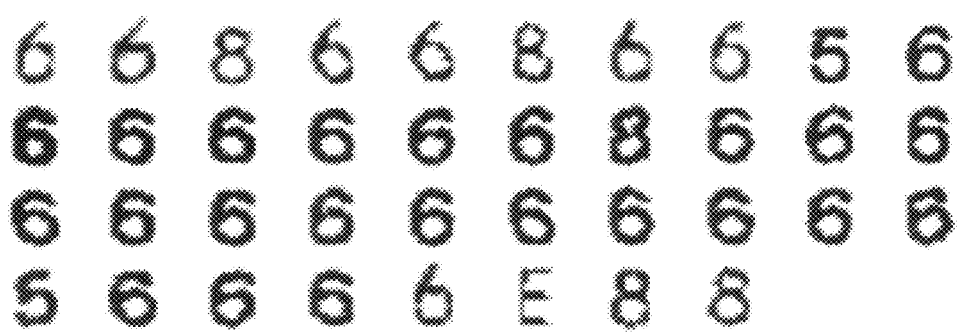
310
315
320a
320b

SYSTEM AND METHOD FOR INCREASING THE ACCURACY OF OPTICAL CHARACTER RECOGNITION (OCR)

BRIEF DESCRIPTION OF THE FIGURES

FIGS. 3 and 5 illustrate an example method, according to one embodiment.

DETAILED DESCRIPTION OF EMBODIMENTS OF THE INVENTION

Figure 1:
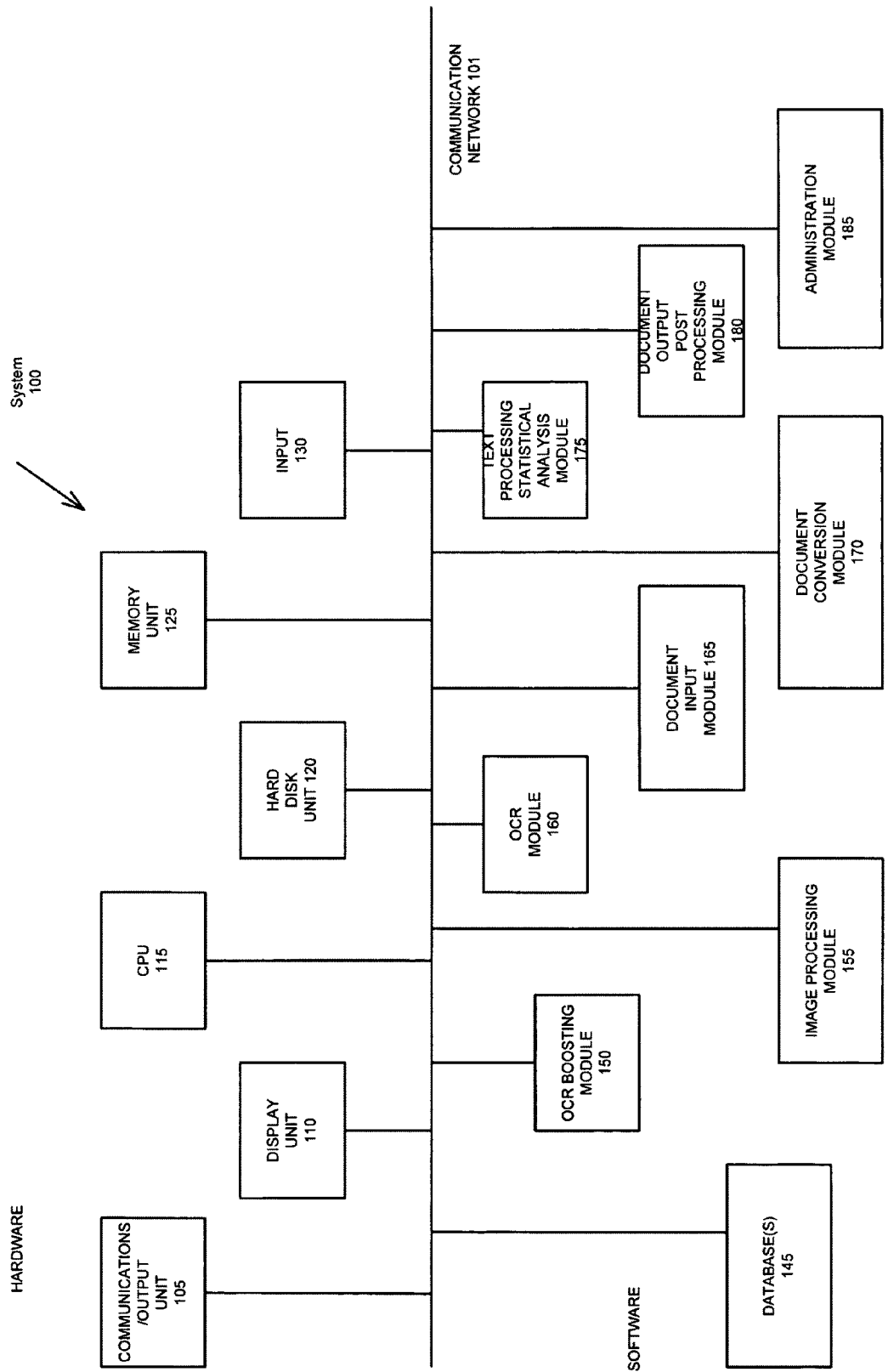
FIG. 1 illustrates a system for increasing the accuracy of OCR recognition, according to one embodiment.

FIG. 1 illustrates a system for increasing the accuracy of OCR recognition, according to one embodiment. In one embodiment, the system 100 can comprise at least one communication network 101 that connects hardware and software elements. In some embodiments, the hardware can execute the software.

The hardware can comprise at least one communications/output unit 105, at least one display unit 110, at least one centralized processing unit (CPU) 115, at least one hard disk unit 120, at least one memory unit 125, and at least one input unit 130. The communications/output unit 105 can send results of extraction processing to, for example, a screen, printer, disk, computer and/or application. The display unit 110 can display information. The CPU 115 can interpret and execute instructions from the hardware and/or software components. The hard disk unit 120 can receive information (e.g., documents, data) from CPU 115, memory unit 125, and/or input 130. The memory unit 125 can store information. The input unit 130 can receive information (e.g., at least one document image or other data) for processing from, for example, a screen, scanner, disk, computer, application, keyboard, mouse, or other human or non-human input device, or any combination thereof.

The software can comprise one or more databases 145, at least one OCR boosting module 150, at least one image processing module 155, at least one OCR module 160, at least one document input module 165, at least one document conversion module 170, at least one text processing statistical analysis module 175, at least one document/output post processing module 180, and at least one systems administration module 185. The database 145 can store information. The image processing module 155 can include software which can process images. The OCR module 160 can include software which can generate a textual representation of the image scanned in by the input unit 130 (using, for example, a scanner). It should be noted that multiple OCR modules 160 can be utilized, in one embodiment. In addition, different parameter sets and different image preprocessing can be utilized. For example, parameter sets that can be utilized for different OCR modules can comprise, but are not limited to: certain dictionaries, applicable languages, character subsets to be recognized (e.g., all digits or all characters). Image preprocessing can include, but is not limited to: rotation correction, noise removal, edge enhancement filters (e.g., enhancing the edge contrast of an image to make the edge look more defined), color space modifications (e.g., translating the representation of a color from one reference frame to another to make the translated image look more similar to the original image), and any combination thereof. The document input module 165 can include software which can work with pre-processed documents (e.g., preprocessed in system 100 or elsewhere) to obtain information (e.g., used for training). For example, if documents are available that were already OCRed, the information from these documents (e.g., imagelets and characters) can be used in the OCR booster training phase to create OCR booster sets. Document representations (e.g., images and/or OCR text) can be sent to the OCR boosting module 150, which can perform learning, extraction and validation For example, as explained in more detail below with respect to FIGS. 2-5, using an image and an initial OCR result as input, the OCR boosting module 150 can be trained and/or used to get a second opinion regarding the correctness of the initial OCR result, including a confidence rating related to the second OCR result. The document conversion module 170 can include software which can transform a document from one form to another (e.g., from Word to PDF). A text processing statistical analysis module 175 can include software which can provide statistical analysis of the generated text to pre-process the textual information. For example, information such as the frequency of words, etc. can be provided. A document/output post processing module 180 can include software which can prepare a result document in a particular form (e.g., a format requested by a user). It can also send result information to a third party or internal application for additional formatting and processing. The system administration module 185 can include software which allows an administrator to manage the software and hardware. In one embodiment, individual modules can be implemented as software modules that can be connected (via their specific input interface) and their output can be routed to modules desired for further processing. All described modules can run on one or many CPUs, virtual machines, mainframes, or shells within the described information processing infrastructure, such as CPU 115. Database 145 can be stored on hard disk unit 120.

Figure 2:
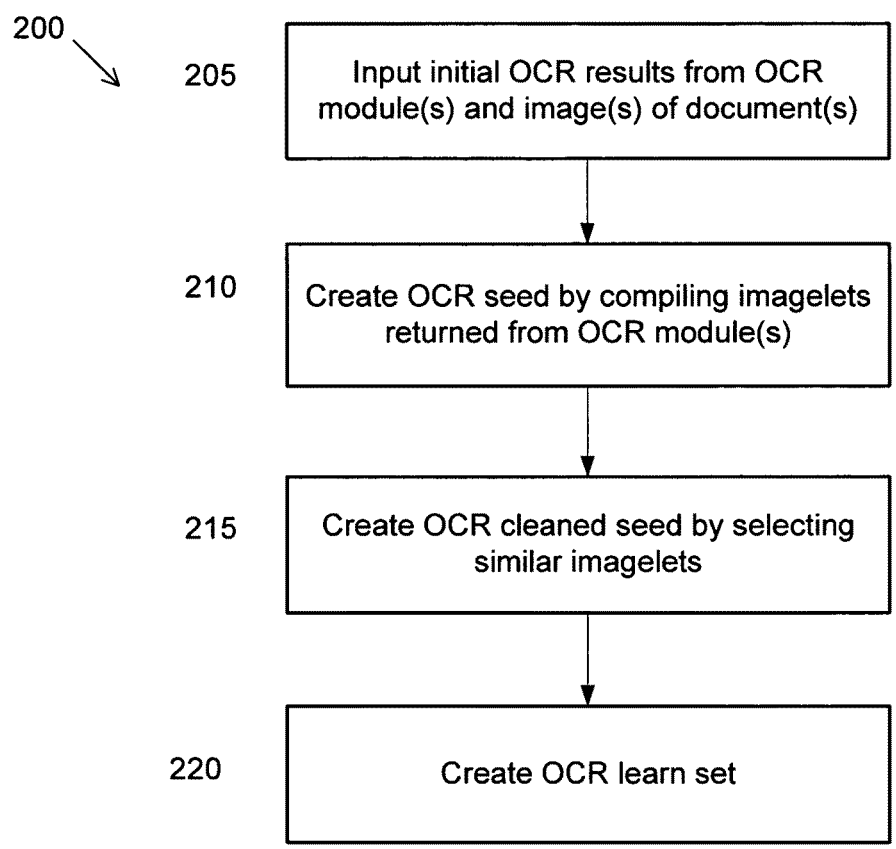
FIGS. 2 and 4 illustrate a method for increasing the accuracy of OCR recognition, according to one embodiment.

The OCR boosting module 150 can perform learning, extraction and validation (discussed further with respect to FIGS. 2-3). Additional information generated by the OCR boosting module 150 can be sent to the databases(s) 145 or to external inputs (e.g., communications/output unit 105, communication network 101, hard disk unit 120, and administration module 185). The output or part of the output of the extraction module 150 can be stored, presented or used as input parameters in various components (e.g., communications/output unit 105, display unit 110, hard disk unit 120, memory unit 125, communication network 101, conversion module 170, database(s) 145, OCR module 160, statistical analysis module 175) either using or not using the post-processing module 180. Such a feedback system can allow for iterative refinement.

Figure 4:
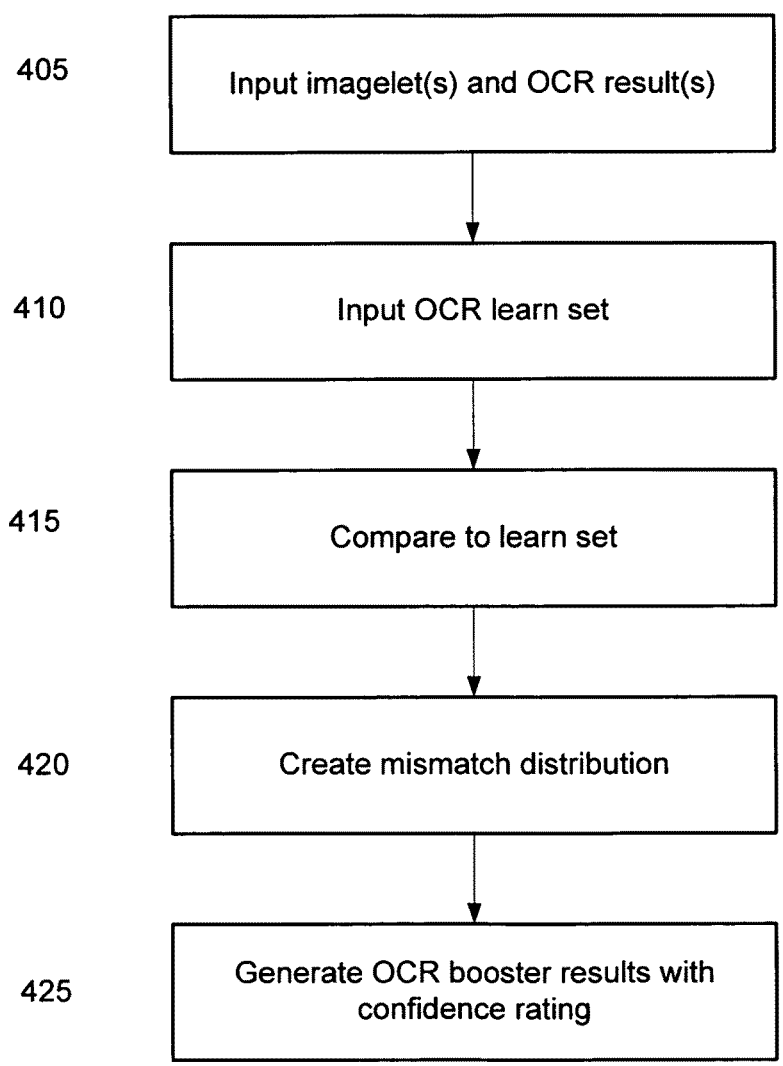
Figure 5:
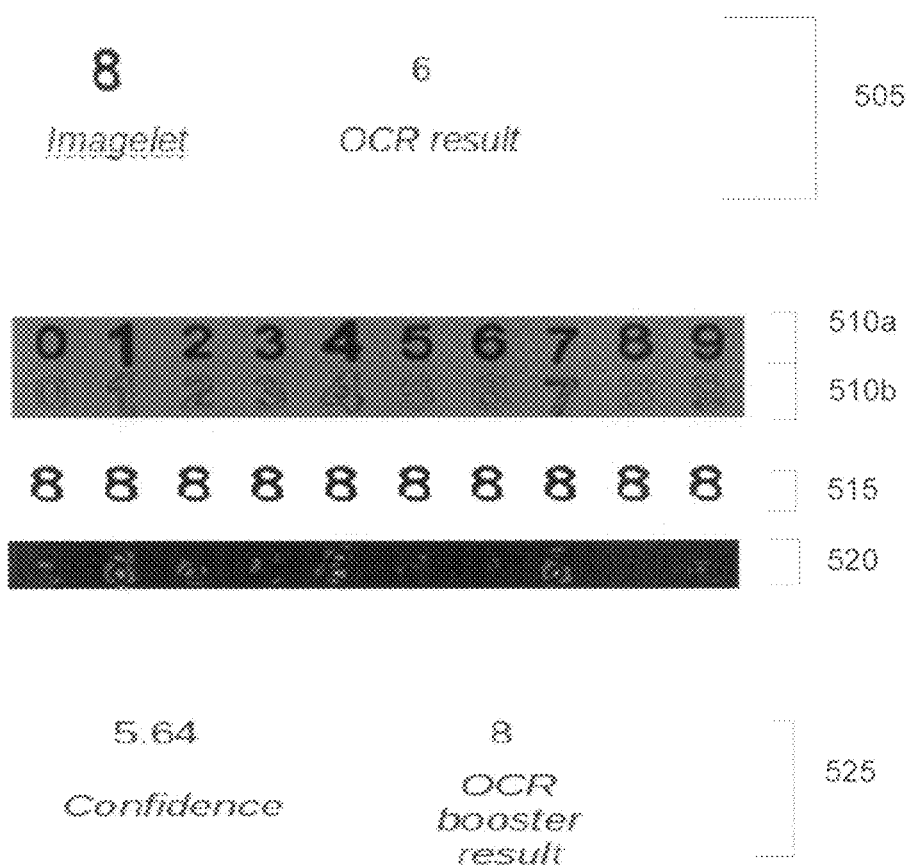

FIGS. 2 and 4 illustrate a method for increasing the accuracy of OCR recognition, and FIGS. 3 and 5 illustrate an example method, according to one embodiment. In particular, FIGS. 2 and 3 illustrate a method 200 and example of method 200 for building a learn set to increase the accuracy of OCR recognition. FIGS. 4 and 5 illustrate a method 400 and example of method 400 for comparing new documents to the learn set to increase the accuracy of OCR recognition.

Referring to FIG. 2, in 205, at least one image of at least one document can be scanned into the input unit 130 (using, for example, a scanner) and the scanned image can be input into the OCR boosting module 150. For example, an image of an invoice can be scanned in. In addition, initial OCR results from at least one OCR module 160 applied to at least one document can be input into the OCR boosting module 150. For example, initial OCR results from the invoice, comprising data estimated to be the data on the invoice (e.g., "Invoice Date", "Oct. 20, 2008", "Invoice Amount", "203.35"), can be input into the OCR boosting module 150. In one embodiment, the character imagelet (i.e., that portion of the image that caused the OCR module 160 to detect a character) can be sent along with the character found by the OCR module 160 to the OCR boosting module 150.

Note that, in one embodiment, one document, one page, parts of pages (e.g., zones, paragraphs, lines, or words), multiple pages, or multiple documents, or any combination thereof can be input into the OCR boosting module 150. Because method 200 can be based on small document parts, rather than full documents or multiple documents, generalization (e.g., due to multiple fonts, multiple font scales, multiple font properties (e.g., bold, italic)), done in order to identify the character(s) of interest, can be minimized because there is often less variance when a smaller set rather than a larger set (e.g., a line or paragraph versus multiple pages) is input into the OCR boosting module 150. Additionally, in one embodiment, method 200 can be utilized for each subset of characters. Thus, the potential confusion between characters within an OCR learn set can be restricted to such character subsets. Examples for such subsets are digits, punctuation marks, small alphabetical characters, capital alphabetical characters, etc. It should also be noted that an OCR learn set can include manually input examples. For example, if a certain set of invoices always have the same OCR error, an operator may want to put in the correct character and add it to the OCR learn set so that future documents will have a higher likelihood of being correct.

In 210, at least one OCR seed is created by compiling the imagelets (i.e., image part or character imagelet) corresponding to the characters obtained by the OCR module 160 from the image of the document. The imagelets can be obtained by extracting each character imagelet from the document image. A character segmentation algorithm can be used to generate the character imagelet based on the character imagelet's coordinates (e.g., represented by a bounding box) in the document image. For example character segmentation algorithm options, see Casey, R. G. et al., A Survey of Methods and Strategies in Character Segmentation, *IEEE Trans. Pattern Anal. Mach. Intell.*, Vol. 18, No. 7 (July 1996), 690-706.

For example, referring to FIG. 3, the OCR boosting module 160 can obtain the character imagelets in the document which the OCR module 160 has converted as the character "6". The OCR module could thus obtain several "6" characters, and also mistakenly obtain "8", "5", and "E", as these often look similar to the character "6".

It should be noted that character imagelets are often not all the same, due to OCR errors. However, as OCR modules 160 can return a large number (e.g., more than 50%) of correct characters, the correct class can dominate the dataset.

Referring again to FIG. 2, in 215, an OCR cleaned seed can be created by selecting similar imagelets from the OCR seed (e.g., based on the pixel or color space information as described below in 515 and 520 of FIG. 5). Similar imagelets can be determined by statistical measurements and/or clustering methods which can calculate distances (e.g. pixel based) between the imagelets to determine their similarity. Examples of the statistical measurements and/or clustering methods that can be used include, but are not limited to: Bayes Networks, Principle Component Analysis, ANOVA, MANOVA, Independent Component Analysis, or human intervention, or any combination thereof. In FIG. 5 this similarity based selection process is illustrated. The calculated distances can then be used to create a subset of similar imagelets referred to as an OCR cleaned seed. The OCR cleaned seed can comprise any number of imagelets (e.g., none, some, all) from the initial set. Multiple fonts, multiple font scales, and/or multiple font properties (e.g., bold, italic) can be taken into account. For example, in one embodiment, information returned from the OCR or extracted by the OCR booster module regarding font type and font size could be used to create OCR cleaned sub-seeds comprising only imagelets that are also similar with respect to a specific font type or font size. As another example, an OCR cleaned sub-seed can be created comprising only imagelets that are digits, and another OCR cleaned sub-seed can be created comprising only imagelets that are digits in bold font. Creation and subsequent application of cleaned sub-seeds can improve OCR boosting performance.

315 of FIG. 3 illustrates an example of a cleaned OCR seed (created in 215 of FIG. 2). In 315, a filtered set of imagelets that are very similar in terms of OCR result and font properties is shown. Based on this set of imagelets a learn set can be created, as shown in 220 of FIG. 2. The learn set can comprise, for each of the characters identified by the OCR module 160, an average and variance for imagelets identified as corresponding to each character. It should be noted that different learn sets can be created based on different documents. For example, documents from vendor 1 may have a different OCR learn set than documents from vendor 2. Thus, a new document could be classified and then OCR'd; or OCR'd, classified, and then OCR'd again.) In 320*a* and 320*b* of FIG. 3, an example of such a learn set, where the imagelets of interest are the digits 0 to 9, is shown. In 320*a*, the average over the pixels (e.g., in 2D) for all selected imagelets for each character (e.g., 0 to 9) is shown, wherein the variance is indicated in black. In 320*b*, the variance for the same selected imagelets (e.g., corresponding to characters 0 to 9) is shown. Note, that the highest variability can be shown at the edges of the digits. As described with respect to FIG. 5, this information can be taken into account during the application of the learn set for actual OCR boosting to calculate confidence levels.

It should be noted that the OCR learn set can also be used to train classifiers (e.g., support vector machines, neural networks) directly. The imagelets and the respective OCR initial results can be used as input for such trainable classifiers and the training can be performed according to certain algorithms. Such algorithms can be, but are not limited to Support Vector Machines Neural Networks, Bayes classifiers, Decision trees and bootstrapping methods. The actual OCR boosting (i.e., obtaining a second opinion on given OCR results for given imagelets) can be performed by applying the pre-trained classifiers (this process can be referred to as a classification phase). Classifiers can be trained based on filtered, unfiltered, preprocessed, or raw imagelet sets.

As noted above, FIGS. 4 and 5 illustrate a method 400 and example of method 400 for comparing new documents to the learn set to increase the accuracy of OCR recognition, according to one embodiment. Referring to FIG. 4, in 405, at least one imagelet from at least one new document is input, along with its initial OCR result. In 505 of FIG. 5, an example of imagelet "8" is input along with the result that the OCR found: "6". Note that many other imagelets and their OCR result could be input.

In 410, the OCR learn set learned in 220 is input. As noted above, the OCR learn set can contain an average and variance for each imagelet of interest. For the example of FIG. 5, the OCR learn set illustrated in 320*a*/320*b* of FIG. 3 is utilized in 510*a*/510*b* of FIG. 5.

In 415, each imagelet of interest from the new document is compared to the OCR learn set. In the example of 515 in FIG. 5, the imagelet "8" is compared to each character in the learn set (visualized by mean 510*a* and variance 510*b* for the digits 0 to 9). In 515, the same imagelet "8" is shown under each digit in the learn set (510*a* and 510*b*) to illustrate the comparison of the imagelet "8" with each of the digits in the learn set.

Referring back to FIG. 4, in 420, a mismatch distribution is created for each imagelet using the comparison of imagelet(s) of the new document with the OCR learn set. An example of a mismatch distribution of a comparison is illustrated in 520 of FIG. 5, where a mismatch distribution is created for the imagelet "8" versus the digits 0 to 9 (all the digits in this example learn set). In mismatch distribution 520, green indicates a relative excess of pixels between the imagelet to be checked and the learn set characters, red indicates a lack of pixels between the imagelet to be checked and the learn set characters, and black indicates a match (e.g., no difference between the imagelet to be checked and the learn set characters) at the respective position.

In 425, the OCR booster results for a particular imagelet are found by selecting the closest match between the image being analyzed and the images in the learn set. Thus, each character imagelet from the original OCR scanned image can be reclassified using the OCR learn set. This can help solve the inconsistencies and boost the OCR correction rate. In 425, a confidence rating can also be provided. In 525 of FIG. 5, an example of an OCR booster result of "8" is illustrated with a confidence rating of 5.64.

As noted above, a confidence rating can be calculated for OCR booster results for each imagelet of interest by comparing the statistics of the OCR booster learn set for each learned character with the actual imagelet. Confidence values can also be obtained by application of trained classifiers (e.g., Support Vector Machines Neural Networks). Thus, the confidence rating 5.64 given here as an example can be understood as a relative score between the presented imagelet to be OCR boosted and the learn set at its present state.

The confidence rating for each character within the learn set can be used as basis for a confusion matrix. The confusion matrix may be helpful to further refinement fuzzy searching approaches (e.g., by changing the N-gram statistics accordingly), dictionary lookups, or validation rule or regular expression based information retrieval from documents, as the confidence rating obtained by the OCR boosting can narrow down the number of potential characters to be checked (as only characters with high confidence ratings will be checked), and thus avoid combinatorial explosions. For example, for the character sequence "28/01/2009", the OCR booster can return the following confidence ratings for characters 0-9 being an accurate character for the month position underlined above:

| Character | Score |
|---|---|
| 0 | 8.1 |
| 1 | 0.6 |
| 2 | 0.5 |
| 3 | 0.1 |
| 4 | 0.2 |
| 5 | 0.3 |
| 6 | 0.5 |
| 7 | 0.2 |
| 8 | 0.1 |
| 9 | 5.8 |

From the chart above, the amount of potential boosted characters to check can be reduced from ten (0, 1, 2, 3, 4, 5, 6, 7, 8 and 9) to two (0 and 9), because all the other characters have very low scores. Given the information that the data is a character sequence with a date of format XX/XX/XXXX, the "9" at the underlined position can be ruled out as well. Thus, for any further processing, the character of interest can be assumed to be only a "0".

It should be also noted that OCR booster learn sets containing probability weighted 2D pixel information for the current document (or page, zone, etc.) can be generated and can be dynamically adapted while changing documents (or pages, zones, etc.) by keeping a history of imagelets and adding new ones successively. For example, the example OCR seed 310 of FIG. 3 can be used to modify document processing. The number of imagelets could thus continue to grow. It is also possible to use aging on the imagelet buffer and remove the "oldest" imagelets when adding a new one or ones. In this way, for example, the OCR booster learn set can adapt to changing properties of the document as the document is processed in sequential zones. In this way, as described above, the OCR booster learn set can exactly match the current font, as typical documents do not change font from character to character, but rather from paragraph (or other similar textual zones) to paragraph.

In addition, it should be noted that the OCR booster learn sets containing confidence rated 2D pixel information can include the variance of the character pixels and the noise statistics of the whitespace surrounding the characters. Statistics about the background noise can be quite useful to devise filters to remove that noise. The OCR booster learn set can contain the statistics of the characters (e.g., their respective pixels) and the variance of the edges (examples of both shown in 320*a* and 320*b*). Additionally, the statistics of the background (e.g., the space besides the character-pixels) can be obtained. From this, statistics about speckle noise can be devised and utilized as additional input in despeckle filter design.

Furthermore, when OCR booster learning and application is performed on a single page, even rotation of the document can be incorporated into the OCR booster learn set, as the entire page can be rotated but not each character individually. This can result in a relative rotation between the characters within one page by 0 degrees, even when the entire page is rotated.

It should also be noted that, as discussed above with respect to 205 of FIG. 2, because a smaller set (e.g., a part of a page versus several pages) can be input into the OCR boosting module 150, the imagelet's background information (described in more detail with respect to FIG. 3) can be taken into account in the OCR learn set. For example, when the imagelet background contains specific pixel patterns (e.g., ones that usually occur when grayscale images are sampled at one bit color space), such pixel patterns can be weighted less in the imagelet distance calculation. These pixel patterns are then known to represent only background information that should be ignored during the OCR boosting imagelet comparison. Thus, additional algorithms that remove background noise are not mandatory.

Furthermore, as the OCR learn set can be based on a smaller set, image distortion will not be as common. For example, if multiple pages are used to create the OCR learn set, as the pages are scanned, the pages often are not aligned perfectly, and thus the imagelets will have more variability, increasing the generalization that must be done. If however, only one paragraph of one page is used, there will not be image distortion as only one page is scanned. It should be noted that a high amount of generalization causes errors that a human would not likely make (e.g., mistaking a slightly distorted "8" for an "f"). In contrast, a low amount of generalization often causes errors that a human would make (e.g., mistaking a "1" (one) for an "l" (letter l). Making only errors that a human would make can increase acceptability of the system 100, as the system 100 would be no more inaccurate than a human, and would often cost much less to use than a human.

It should be noted that any of the information found utilizing the system 100 and method 200 above (e.g., the OCR seed, the OCR cleaned seed, the OCR learn set, as well as any information related to the mismatch distribution, OCR booster results, and confidence rating) can be stored (e.g., as the learn set, the imagelet collection or the respective statistics). This information can be re-used when an image from the same or similar class is to be reviewed. The information can be used as part or replacement of the initial OCR run, creating the OCR seed, or as a basis of the learn set for the document, thus increasing the reliability of the statistics. In addition, the overall procedure of the method 200 can be performed iteratively to allow for a refinement of the data, preprocessing methods, and/or other parameters.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

In addition, it should be understood that the figures described above, which highlight the functionality and advantages of the present invention, are presented for example purposes only. The architecture of the present invention is sufficiently flexible and configurable, such that it may be utilized in ways other than that shown in the figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method for increasing the accuracy of optical character recognition (OCR) for at least one item, comprising:
    obtaining OCR results of OCR scanning from at least one OCR module;
    creating at least one OCR seed using at least a portion of the OCR results, the at least one OCR seed comprising a plurality of imagelets corresponding to each character identified in the at least a portion of the OCR results, wherein the at least one OCR seed is cleaned by selecting imagelets similar to one another for each character identified in the at least a portion of the OCR results;
    creating at least one OCR learn set using at least a portion of the OCR seed;
    comparing the at least one OCR learn set to each imagelet to create at least one mismatch distribution of the at least one OCR learn set compared to each imagelet, the at least one mismatch distribution comprising at least one confidence rating including a confidence score for the imagelet compared to at least one possible character; and
    applying the OCR learn set and the at least one mismatch distribution to the at least one item to obtain additional OCR results such that only possible characters having a confidence score higher than a threshold are considered when applying the at least one mismatch distribution to obtain the additional OCR results.

2. The method of claim 1, wherein image statistics are deducted based on the at least one OCR learn set.

3. The method of claim 1, wherein the at least one item comprises:
    at least one page;
    at least one document;
    at least one part of at least one document;
    at least one zone;
    at least one paragraph;
    at least one line;
    at least one word; or
    at least one character; or
    any combination thereof.

4. The method of claim 1, wherein the at least one OCR learn set is used on different items.

5. The method of claim 1, wherein different OCR modules and/or different parameter sets and/or different preprocessing steps are used.

6. The method of claim 1, wherein the additional OCR results take into account:
    font size;
    font type; or
    font properties; or
    any combination thereof.

7. The method of claim 1, wherein whitespace characteristics are taken into account in creating the at least one OCR learn set.

8. The method of claim 1, wherein the method is performed iteratively to allow for a refinement of the method.

9. The method of claim 1, wherein the at least one OCR learn set comprises stored imagelets and/or new imagelets.

10. The method of claim 1, wherein stored imagelets are used to increase the at least one OCR learn set.

11. The method of claim 1, wherein the at least one OCR learn set and related statistics are used to derive at least one image filtering technique.

12. The method of claim 1, wherein the OCR learn set is created by obtaining information related to the image representation for each character and the variability of the similar imagelets from the image representation for each character in the at least one OCR cleaned seed.

13. The method of claim 12, wherein the image representation is a bitmap.

14. The method of claim 13, wherein the bitmap is grayscale or color.

15. The method of claim 1, wherein statistical measurements and/or cluster analysis is used to select similar imagelets.

16. The method of claim 15, wherein the statistical measurements and/or the cluster analysis comprises:
    at least one Bayes classifier;
    at least one neural networks classifier;
    at least one support vector classifier; or
    any combination thereof.

17. A system for increasing the accuracy of optical character recognition (OCR) for at least one item, comprising:
    at least one processor, wherein the at least one processor is configured to perform:
        obtaining OCR results of OCR scanning from at least one OCR module;

creating at least one OCR seed using at least a portion of the OCR results, the at least one OCR seed comprising a plurality of imagelets corresponding to each character identified in the at least a portion of the OCR results, wherein the at least one OCR seed is cleaned by selecting imagelets similar to one another for each character identified in the at least a portion of the OCR results;

creating at least one OCR learn set using at least a portion of the OCR seed;

comparing the at least one OCR learn set to each imagelet to create at least one mismatch distribution of the at least one OCR learn set compared to each imagelet, the at least one mismatch distribution comprising at least one confidence rating including a confidence score for the imagelet compared to at least one possible character; and applying the OCR learn set and the at least one mismatch distribution to the at least one item to obtain additional OCR results such that only possible characters having a confidence score higher than a threshold are considered when applying the at least one mismatch distribution to obtain the additional OCR results.

18. The system of claim 17, wherein image statistics are deducted based on the at least one OCR learn set.

19. The system of claim 17, wherein the at least one item comprises:
   at least one page;
   at least one document;
   at least one part of at least one document;
   at least one zone;
   at least one paragraph;
   at least one line;
   at least one word; or
   at least one character; or
   any combination thereof.

20. The system of claim 17, wherein the at least one OCR learn set is used on different items.

21. The system of claim 17, wherein different OCR modules and/or different parameter sets and/or different preprocessing steps are used.

22. The system of claim 17, wherein the additional OCR results take into account:
   font size;
   font type; or
   font properties; or
   any combination thereof.

23. The system of claim 17, wherein whitespace characteristics are taken into account in creating the at least one OCR learn set.

24. The system of claim 17, wherein the method is performed iteratively to allow for a refinement of the method.

25. The system of claim 17, wherein the at least one OCR learn set comprises stored imagelets and/or new imagelets.

26. The system of claim 17, wherein stored imagelets are used to increase the at least one OCR learn set.

27. The system of claim 17, wherein the at least one OCR learn set and related statistics are used to derive at least one image filtering technique.

28. The system of claim 17, wherein the OCR learn set is created by obtaining information related to the image representation for each character and the variability of the similar imagelets from the image representation for each character in the at least one OCR cleaned seed.

29. The method of claim 28, wherein the image representation is a bitmap.

30. The method of claim 29, wherein the bitmap is grayscale or color.

31. The system of claim 17, wherein statistical measurements and/or cluster analysis is used to select similar imagelets.

32. The system of claim 31, wherein the statistical measurements and/or the cluster analysis comprises:
   at least one Bayes classifier;
   at least one neural networks classifier;
   at least one support vector classifier; or
   any combination thereof.

\* \* \* \* \*